(12) United States Patent
Schulz et al.

(10) Patent No.: US 11,377,193 B2
(45) Date of Patent: Jul. 5, 2022

(54) WINDOW ELEMENT WITH A NON-CONCEALING COVER, AIRCRAFT REGION AND AIRCRAFT WITH A WINDOW ELEMENT

(71) Applicant: Airbus Operations GmbH, Hamburg (DE)

(72) Inventors: Volkhard Schulz, Hamburg (DE); Hinnerk Kleinwort, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 244 days.

(21) Appl. No.: 16/688,334

(22) Filed: Nov. 19, 2019

(65) Prior Publication Data
US 2020/0156756 A1 May 21, 2020

(30) Foreign Application Priority Data
Nov. 20, 2018 (DE) .......................... 102018129159.0

(51) Int. Cl.
*B64C 1/14* (2006.01)
(52) U.S. Cl.
CPC .......... *B64C 1/1492* (2013.01); *B64C 1/1484* (2013.01)
(58) Field of Classification Search
CPC ............................ B64C 1/1492; B64C 1/1484
See application file for complete search history.

(56) References Cited

U.S. PATENT DOCUMENTS

| | | | | |
|---|---|---|---|---|
| 2,453,343 A | * | 11/1948 | Reilly ...................... | B60J 10/70 52/773 |
| 4,541,595 A | | 9/1985 | Fiala et al. | |
| 8,522,496 B2 | | 9/2013 | Boer et al. | |
| 9,567,061 B2 | | 2/2017 | Vogt et al. | |
| 10,654,555 B2 | | 5/2020 | Hanske et al. | |
| 2008/0067288 A1 | * | 3/2008 | Eberth ...................... | B64C 1/12 244/129.3 |
| 2008/0078877 A1 | * | 4/2008 | Switzer ................. | B64C 1/1492 244/129.3 |

(Continued)

FOREIGN PATENT DOCUMENTS

| | | |
|---|---|---|
| DE | 102009031523 B4 | 1/2011 |
| DE | 102011108167 B4 | 1/2013 |

(Continued)

OTHER PUBLICATIONS

German Search Report; priority document.
French Search Report from corresponding French Patent Application No. 1912830 dated Oct. 6, 2021.

*Primary Examiner* — Christopher D Hutchens
(74) *Attorney, Agent, or Firm* — Greer, Burns & Crain, Ltd.

(57) ABSTRACT

A window element for an aircraft comprises a window frame which has a frame reveal forming an opening, and a receptacle adjoining the frame reveal, an inner window pane which is configured to be inserted into the receptacle, a holding frame which is configured to be inserted into the receptacle and to fix the inner window pane in the receptacle, and a cover which has an opening and is configured to be attached to the window frame and to conceal the window frame around the frame reveal. An encircling inner edge of the cover that forms the opening of the cover lies radially substantially outside an encircling inner edge of the receptacle.

13 Claims, 5 Drawing Sheets

(56) References Cited

U.S. PATENT DOCUMENTS

| | | | | |
|---|---|---|---|---|
| 2008/0217479 A1* | 9/2008 | Wood | ............... | E06B 3/5481 |
| | | | | 244/129.3 |
| 2013/0340957 A1* | 12/2013 | Knowles | ............... | B64C 1/1484 |
| | | | | 160/369 |
| 2019/0248282 A1* | 8/2019 | Lee | ............... | B60Q 3/14 |

FOREIGN PATENT DOCUMENTS

| | | | |
|---|---|---|---|
| EP | 2426052 A2 | 3/2012 | |
| EP | 3246243 A1 | 11/2017 | |

\* cited by examiner

FIG. 5a
FIG. 5b
FIG. 5c
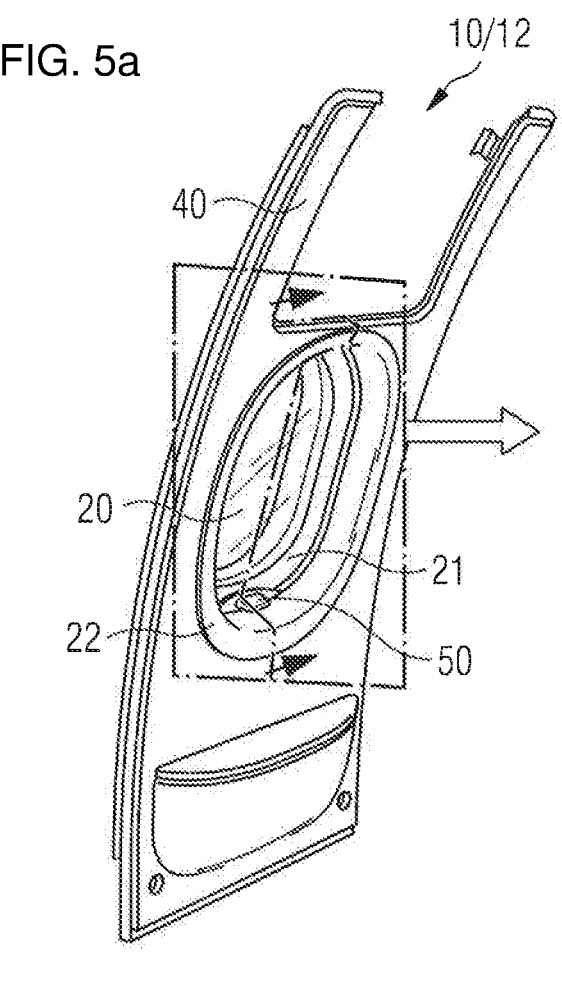
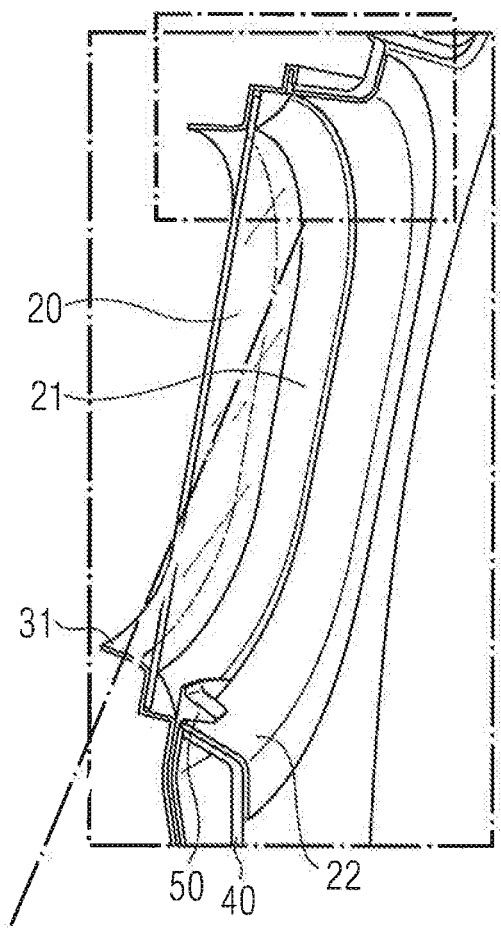
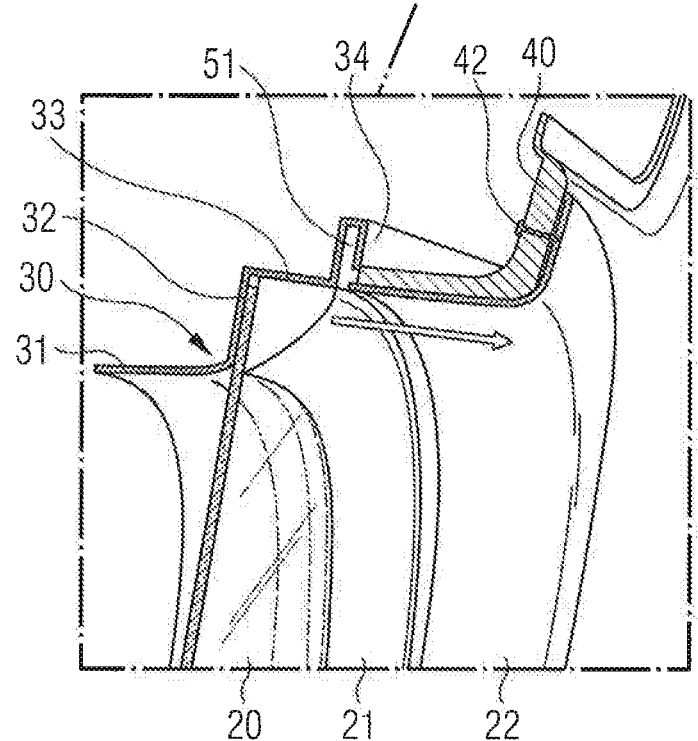

WINDOW ELEMENT WITH A NON-CONCEALING COVER, AIRCRAFT REGION AND AIRCRAFT WITH A WINDOW ELEMENT

CROSS-REFERENCES TO RELATED APPLICATIONS

This application claims the benefit of the German patent application No. 102018129159.0 filed on Nov. 20, 2018, the entire disclosures of which are incorporated herein by way of reference.

FIELD OF THE INVENTION

The invention relates to a window element with a non-concealing cover, an aircraft region with such a window element and an aircraft with such a window element and/or aircraft region.

BACKGROUND OF THE INVENTION

Conventional window elements for aircraft require a series of components which are fastened in one another and to one another, successively, in order to produce the aircraft window. For example, FIGS. 1 and 2 illustrate an upper and a lower detail of an aircraft window 100. The aircraft window 100 has a window pane 120 which is fastened via a holder 121. For this purpose, the holder 121 can be fixed to a window frame 130 by means of a fastener (not illustrated) and, in the process, can securely clamp the window pane 120 to the window frame 130.

The window frame 130 is adjoined by an interior paneling 140 for an aircraft cabin. In order to configure the transition between the window pane 120 and interior paneling 140 to be visually more attractive, a cover 122 is fastened to the window frame 130 or to the interior paneling 140. The cover 122 not only covers the possible fasteners of the holder 121 and connection points or transition points between the window pane 120 and the interior paneling 140, but also at least one portion of the holder 121 facing the cover. The cover 122 can be equipped here with at least one fastener 123, 124. For example, a first fastener 123 can be inserted into a corresponding receiving opening or receiving groove of the window frame 130 or of the interior paneling 140 (see FIG. 1). A fastener 124 of the cover 122 arranged at another location, for example opposite, can be provided in the form of a latching tab or clamping plate. The cover 122 can thereby be fastened to the window frame 130 or to the interior paneling 140 by being latched into place.

Surfaces of the holder 121 and of the cover 122 can indeed be designed in such a manner that they form a continuous profile and therefore the cover 122 forms a visually attractive transition between the holder 121 and the interior paneling 140. However, such a conventional window element 100 makes it difficult to exchange the window pane 120, for example if the latter is scratched and/or has to be cleaned on its outer side, since the cover 122 has to be removed first.

SUMMARY OF THE INVENTION

The invention is therefore based on an object of providing a window element which has a simpler design. Furthermore, the invention is based on the object of specifying an aircraft region and an aircraft with such a window element.

A window element for an aircraft comprises a window frame which has a frame reveal forming an opening, and a receptacle adjoining the frame reveal, and an inner window pane which is configured to be inserted into the receptacle. The frame reveal can be suitable for receiving at least one outer window pane or multi-paned windows. The inner window pane is the window pane of the window element that delimits the interior of the aircraft.

The window element furthermore comprises a holding frame which is configured to be inserted into the receptacle and to fix the inner window pane in the receptacle, and a cover which has an opening and is configured to be attached to the window frame and to conceal the window frame around the frame reveal. The opening of the cover is preferably of such a size that it substantially corresponds to the size of the opening formed by the frame reveal. As a result, the view through the opening formed by the frame reveal is not blocked by the cover.

An encircling inner edge of the cover that forms the opening of the cover preferably lies radially substantially outside an encircling outer edge of the holding frame. The term radially relates here to the direction within a plane formed by the opening of the cover from a center of the opening towards the encircling inner edge of the cover. In other words, the opening of the cover is configured in such a manner that, in an overlap with the shape formed by the outer edge of the holding frame, it does not conceal the shape at any point. The same is true of an inner side of the receptacle that has a shape which is not concealed by the opening of the cover in a common overlap since the inner side of the receptable corresponds, at least in sections, to the outer edge of the holding frame, and therefore the receptacle can receive the holding frame.

This shape of the cover, the receptacle and/or of the holding frame enables the holding frame and the window pane to be removed or dismantled without the cover having to be removed. The window pane can therefore be exchanged rapidly and simply without the cover having to be removed first before the holding frame can be removed. The changing of a window pane is thus not only more rapid and more straightforward, but also reduces the costs incurred by damage to the cover, the damage frequently arising during the dismantling of same. For example, fasteners and holders of the cover can break or be distorted, and therefore the cover becomes unusable and has to be replaced for a new one.

In a refinement of the window element, the receptacle has an encircling receiving reveal which extends substantially perpendicularly to a plane of the window pane, and a flange which, on a side of the encircling receiving reveal, which side faces an outer side of the aircraft, extends substantially parallel to the plane of the window pane towards the opening interior. In other words, the receptacle has a cross section which is L-shaped at least in sections, wherein the receiving reveal and the flange each form limbs of the L-shaped cross section. The inner side of the receiving reveal here forms a surface which corresponds to the opening of the cover. For example, the inside surface of the receiving reveal towards the aircraft interior can have an inner edge which corresponds to the inner edge of the opening of the cover, and is somewhat smaller than the inner edge of the opening of the cover or coincides therewith. The flange and/or the receiving reveal or a part thereof can also be part of the window frame. In other words, the receptacle and the window frame can be an integral (integrated) component.

The holding frame can have a rear side and an outer side which correspond to the shape of the flange and of the receiving reveal of the receptacle. The rear side of the holding frame faces the window pane when the holding frame fixes the window pane in place, and therefore the rear side of the holding frame secures, for example clamps, the window pane between it and the flange of the receptacle.

In a variant refinement, the holding frame can have fixing elements. For example, a projection or a curvature can be provided at least in sections on the outer side of the holding frame, as a result of which a press fit in the receptacle is obtained. A depression corresponding to the projection or the curvature is also conceivable in the receiving reveal, and therefore the holding frame is held in the receiving reveal via a form-fitting connection. Likewise additionally or alternatively, it is also possible to provide a tab or another latching connection on the holding frame, which tab or other latching connection can engage in a corresponding opening of the receptacle and can reach behind the receptacle. This brings about a form-fitting and force-fitting connection of the holding frame. Furthermore, the window pane can also have openings through which such a tab or latching connection reaches and, for example, engages in (engages behind) a corresponding opening of the flange of the receptacle. The last-mentioned refinement also makes it possible to obtain a form-fitting connection between tab/latching connection of the holding frame and opening in the window pane, as a result of which the seating of the window pane is improved.

Alternatively or additionally, the holding frame itself can also be dimensioned in such a manner that it is fastened in the receiving reveal of the receptacle by a press fit. The holding frame can thereby fix the window pane in place without being fastened via a separate fastener in the receptacle or the window frame. It is optionally also possible to provide cut outs in the holding frame and/or the receiving reveal in order to be able to engage with a tool between the outer side of the holding frame and the receiving reveal and to release and to remove the holding frame from its position in the receptacle.

Likewise alternatively or additionally, the holding frame can also be adhesively bonded in the receptacle. The adhesive can be selected here in such a manner that it can be dissolved again, for example by the influence of temperature, in order to remove the holding frame from the receptacle.

In the refinement of the receptacle with the receiving reveal and flange, the inner edge of the cover can border an edge of the receiving reveal facing the aircraft interior. In other words, the shape formed by the inner edge of the cover is greater than a shape formed by the inner edge of the receiving reveal when the two shapes are placed one over the other. If the two shapes are not circles, they can be placed one on the other at least by rotation such that the shape formed by the inner edge of the cover completely overlaps the shape formed by the inner edge of the receiving reveal, in a certain position relative to each other. This makes it possible for both the holding frame and the window pane to fit through the opening of the cover since both the holding frame and the window pane have an outer border which corresponds to or is somewhat smaller than the inner border of the receiving reveal. This makes it possible to remove the holding frame and the window pane through the opening of the cover without having to remove the cover.

In a further refinement, the window element can comprise a wall paneling which is arranged on a side of the window frame facing the aircraft interior, and surrounds the receptacle. The wall paneling can be part of a visible interior paneling of a cabin of the aircraft. The cover can be arranged on the wall paneling (for example as a separate component) and can likewise form part of the visible interior paneling of the cabin of the aircraft.

Alternatively or additionally, at least part of the wall paneling forms the cover. In other words, the cover and the wall paneling can be produced integrally. For example, the wall paneling can be of greater thickness in the region of the cover, can be contrasted in terms of color from the remaining part of the wall paneling or can constitute an inside border of the window in some other way. Alternatively, the cover can also be fastened to the wall covering.

In a further refinement, the window element can furthermore comprise a displaceable window cover. Optionally, for this purpose, a guide can be provided for the displaceable window cover, wherein the guide is attached to the window frame or is integrated therein. The window cover can be arranged in such a manner that it is situated in front of the holder. Furthermore, the window cover can also be arranged in such a manner that it is located behind the wall paneling. The terms "in front of" and "behind" mean facing the inside of the aircraft or the outside of the aircraft.

An aircraft region comprises at least one window element according to one of the above-described refinements. The window element can be produced separately from the rest of the aircraft region. The production of the window element can thereby be decoupled in terms of time from the production of the rest of the aircraft region. This makes it possible to produce the window element more cost-effectively and more advantageously in terms of time since the window element can also be produced at a separate location from the rest of the aircraft region, can be brought to the production site of the aircraft region and can be rapidly completely fitted therein.

In one refinement, the aircraft region can be a fixed fuselage region of an aircraft. Examples of a fixed fuselage region of the aircraft include regions in which aircraft seats or monuments (galleys, toilets, etc.) are arranged. Examples of a non-fixed fuselage region include a door opening or similar movable fuselage part. Alternatively, the aircraft region can also be a door of the aircraft, in particular an emergency exit door. In this case, the window element can be configured identically to all of the remaining window elements of the aircraft, and therefore the number of different structural elements for the aircraft is reduced. Alternatively, a wall paneling of the window element for a window element in a fixed fuselage region can have a different shape than a wall paneling of the window element for a door of the aircraft. The remaining components of the window element can, however, be formed identically.

An aircraft can comprise a window element according to one of the above-described refinements and/or can have an aircraft region according to the above-described refinements.

BRIEF DESCRIPTION OF THE DRAWINGS

Exemplary embodiments of the invention will now be explained in more detail with reference to the attached schematic drawing, wherein FIGS. 5a, 5b and 5c show schematically a perspective view of a further window element with detailed sectional views.

DETAILED DESCRIPTION OF THE PREFERRED EMBODIMENTS

Figure 1:
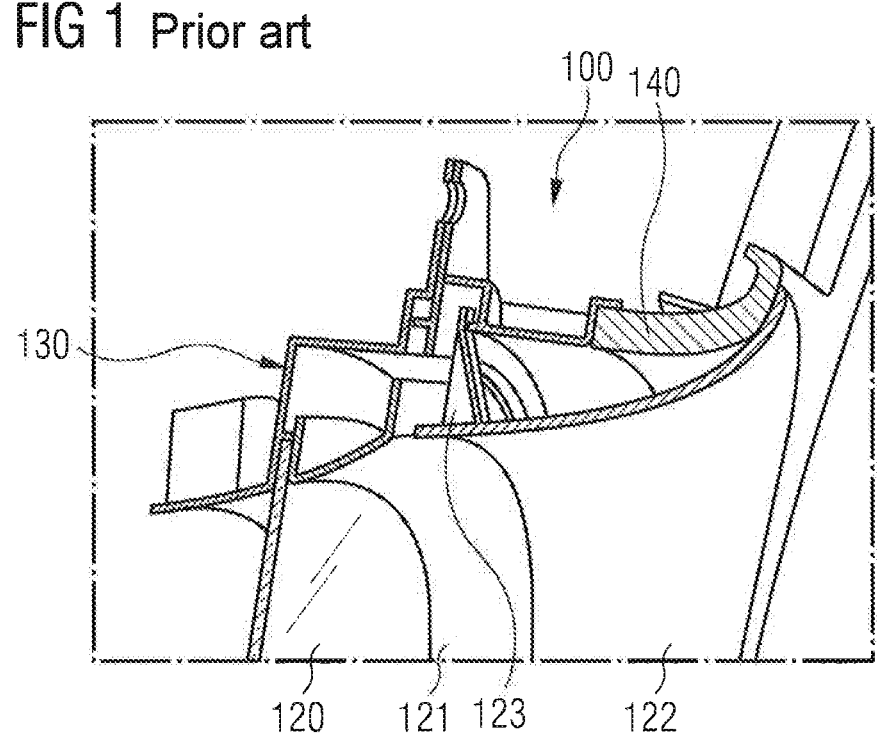
FIG. 1 shows an upper cross section of a conventional window element.
Figure 2:
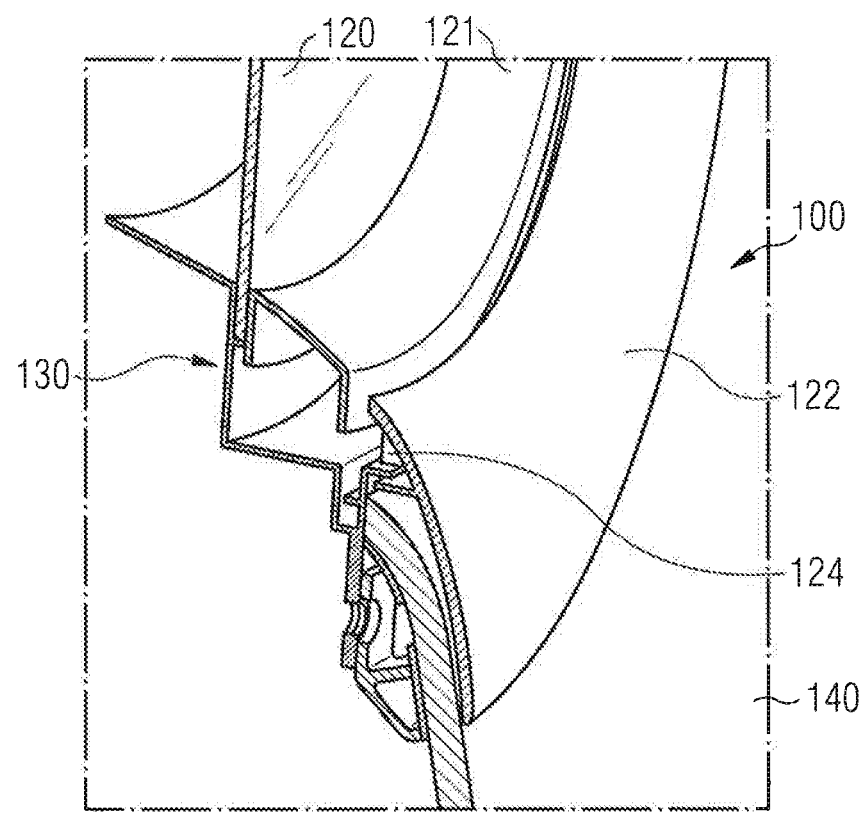
FIG. 2 shows a lower cross section of a conventional window element.
Figure 3:
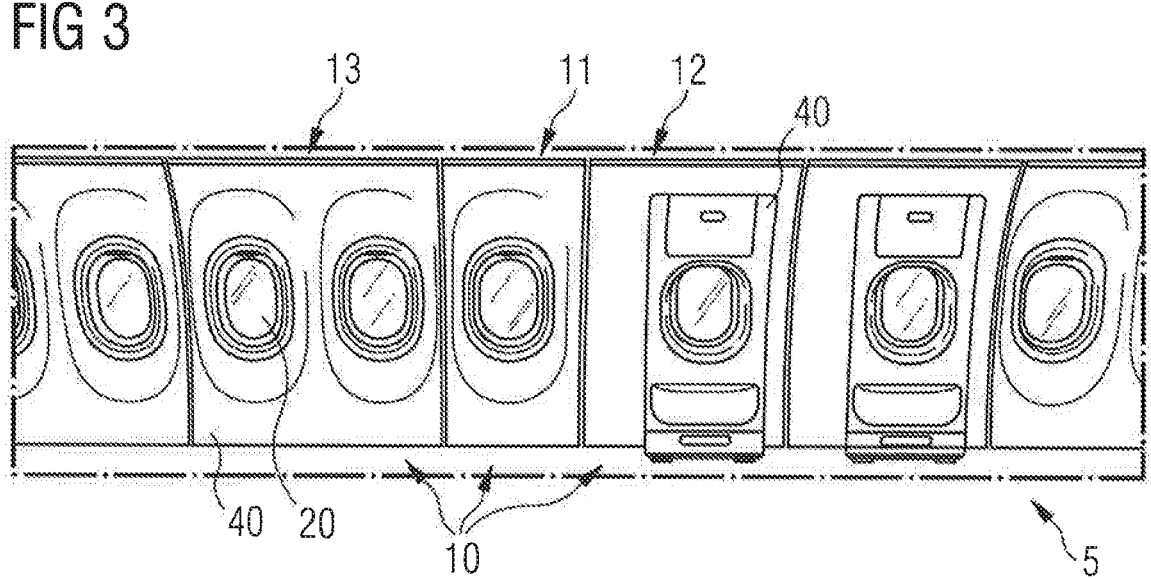
FIG. 3 shows an aircraft region with a plurality of window elements.

An aircraft region 5 which is shown in FIG. 3 and is illustrated from an inside of an aircraft 1 (FIG. 7) has a plurality of window elements 10. A window element 10 can be designed as a window element 11 for an individual window or can be designed as a window element 13 for a multiplicity of windows. The window element 10 can likewise also be designed as a window element 12 of a door, for example, an illustrated emergency exit door.

Each window element 10 has at least one inner window pane 20 and can furthermore comprise a wall paneling 40. While the inner window pane 20 is identical for each window element 10, the wall paneling 40 can differ from type to type of the window elements 11 to 13.

Figure 4A:
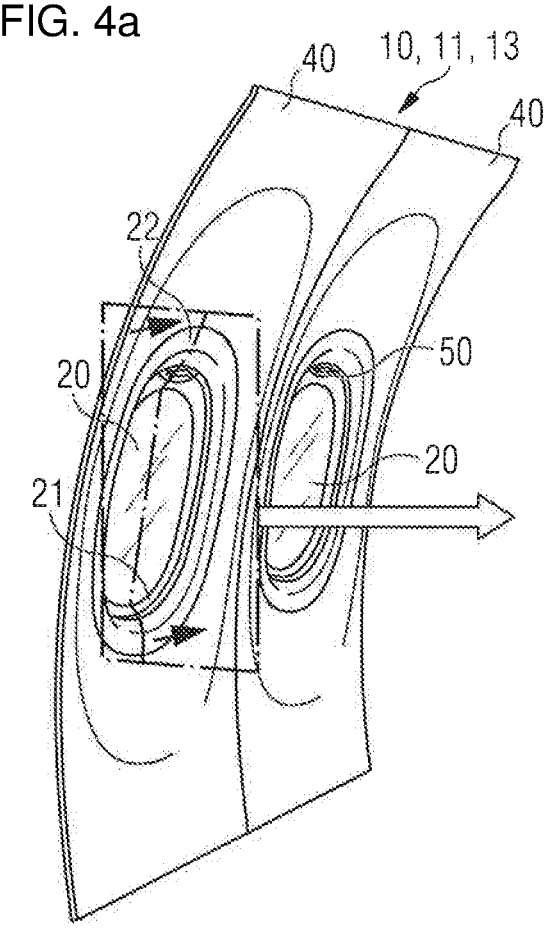
FIGS. 4a, 4b, and 4c show schematically a perspective view of a window element with detailed sectional views.
Figure 4B:
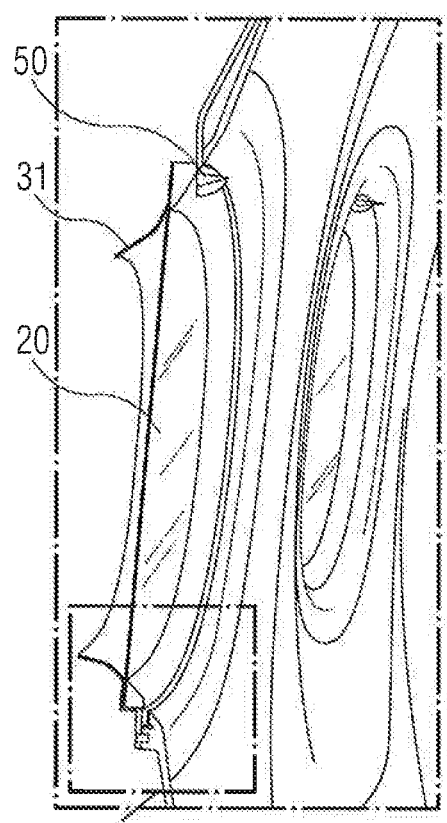
Figure 4C:
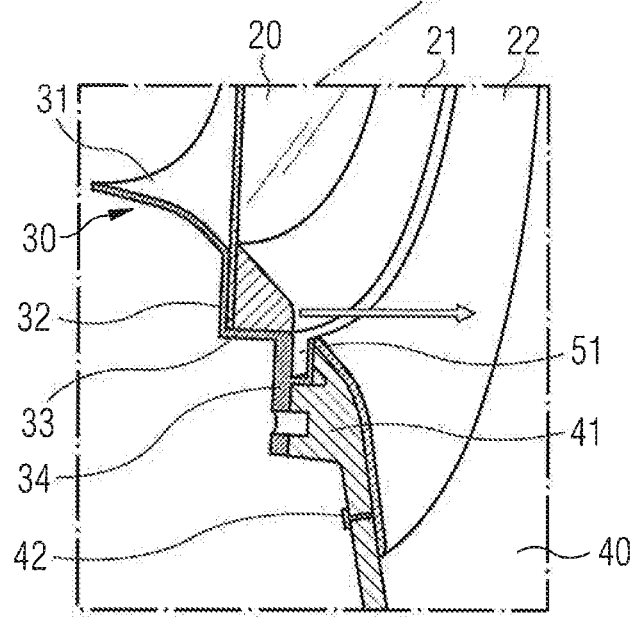

FIGS. 4a, 4b, and 4c show schematically a perspective view of a window element 10 with detailed sectional views. For this purpose, a window element 13 for a plurality of windows is illustrated by way of example. In the view of FIG. 4a, two windows which are arranged next to each other and each have an inner window pane 20 are shown. The wall paneling 40 provided for this purpose can either be produced integrally for both windows or can be produced in each case for one window, and therefore the window element 13 has two wall panelings 40 arranged next to each other.

With regard to the detailed views of FIGS. 4b and 4c, the window element 10 comprises a window frame 30 which has a frame reveal 31 forming an opening and a receptacle adjoining the frame reveal. The receptacle is located on a side of the frame reveal 31 facing the aircraft interior. An inner window pane 20 is inserted in the receptacle. The inner window pane 20 forms a delimitation of the interior of the aircraft 1 and is therefore exposed to influences by the passengers and, for example, can easily be scratched. For the exchange of the inner window pane 20, the latter is fixed in the receptacle by means of a releasable holding frame 21. The holding frame 21 is furthermore configured to be inserted into the receptacle.

For example, for this purpose, the receptacle has an encircling receiving reveal 33 which extends substantially perpendicularly to a plane of the window pane 20. Furthermore, the receptacle has a flange 32 which, on a side of the encircling receiving reveal 33 facing an outer side of the aircraft 1, extends substantially parallel to the plane of the window pane 20 towards the opening interior. The flange 32 of the receptacle thereby forms a stop surface for the window pane 20.

The holding frame 21 can be shaped in such a manner that a rear side and an outer side of the holding frame 21 correspond to the shape of the flange 32 and of the receiving reveal 33, respectively. For example, the rear side and the outside of the holding frame 21 together can be formed in an L-shaped manner and inserted into the L-shaped arrangement of the flange 32 and of the receiving reveal 33. The rear side of the holding frame 21 faces the window pane 20 and the flange 32 when the holding frame 21 fixes the window pane 20 in place. The outer side of the holding frame 21 can interact in a form-fitting manner with the receiving reveal 33, as a result of which the holding frame 21 is fixed by a press fit and secures the window pane 20 in the process. Of course, fasteners and/or other holding mechanisms can also be provided between the holding frame 21 and receptacle and can interact in order to fix the holding frame 21 in the receptacle.

The window element 10 furthermore has a cover 22 which can be fastened to the window frame 30 and/or to the wall paneling 40. For this purpose, by way of example, a fastener 42 which fixes the cover 22 in place is illustrated in FIG. 4c. The cover 22 is configured to conceal the window frame 30 around a frame reveal 31. For example, the cover 22 can conceal a portion 34 of the window frame 30 that adjoins the receptacle outside the latter. Alternatively or additionally, the cover 22 can also conceal a portion 41 of the wall paneling 40 which is fastened to the window frame 30, in particular to the portion 34 of the window frame 30. Of course, the portions 34 and 41 of the window frame 30 and of the wall paneling 40, respectively, can also be assigned to the respective other element of the window element 10 (wall paneling 40 or window frame 30). In other words, the window frame 30 can extend further into the aircraft interior than illustrated in FIG. 4, and the wall paneling 40 can be attached to the window frame 30 further away from the window pane 20 (both as directed into the aircraft interior and as viewed in the radial direction).

The cover 22 has an opening through which a passenger can look through the window. The opening of the cover 22 is formed by an encircling inner edge of the cover 22, wherein the inner edge of the cover 22 lies radially substantially outside an encircling outer edge of the holding frame 21. As a result, as illustrated by the arrow in FIG. 4(c), the holding frame 21 can be removed from its holding position and guided through the opening of the cover 22 without being obstructed by the cover 22. In a top view of the cover 22, the holding frame 21 and the window pane 20 perpendicularly to a plane formed by the window pane 20, the cover 22 does not conceal the holding frame 21 at any point. For example, the shape of the inner edge of the opening of the cover 22 can correspond to the shape of the outer edge of the holding frame 21, and therefore the holding frame 21 can still just be removed through the opening of the cover 22. Alternatively, the shape of the opening of the cover 22 can be selected to be somewhat larger than the shape of the outer edge of the holding frame 21. For example, the inner edge of the opening of the cover 22 can be at a distance from the shape of the outer edge of the holding frame 21 of between 0.5 mm and 5 mm, preferably between 0.5 mm and 3 mm, particularly preferably between 0.5 mm and 1.4 mm.

Figure 6:
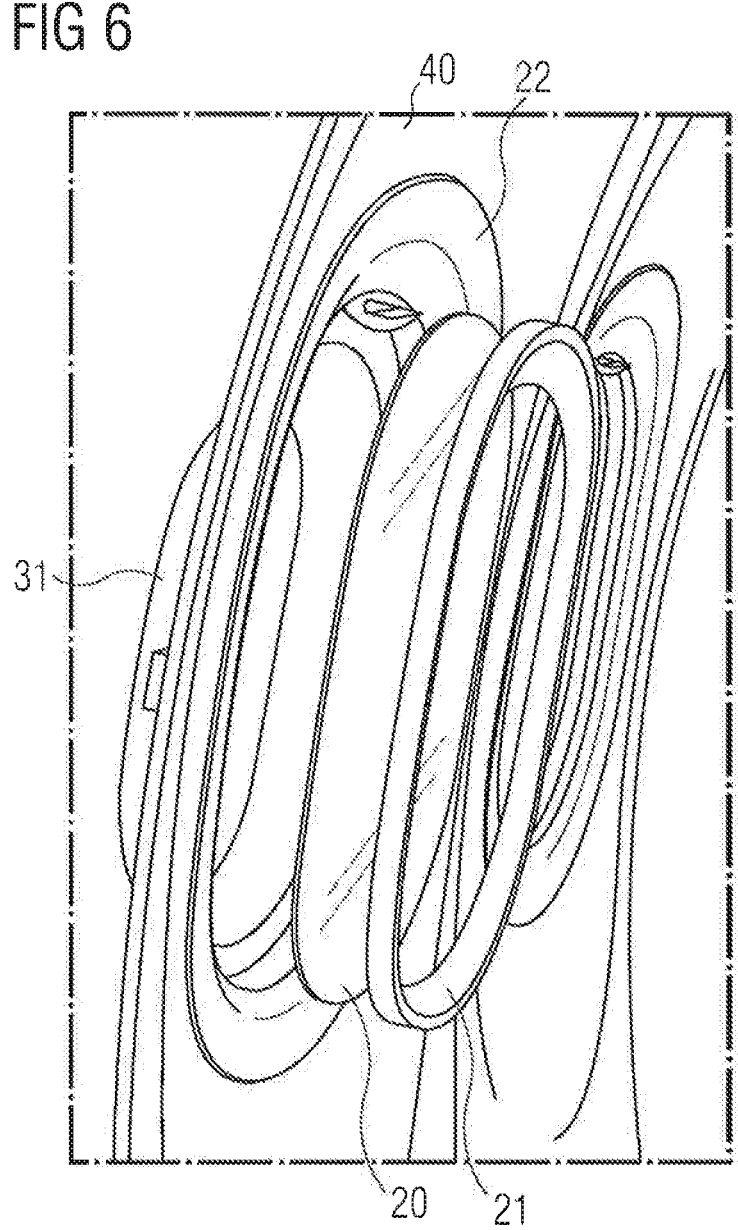
FIG. 6 shows schematically a perspective view of a window element from FIG. 4 with window pane and holder removed.

By removal of the holding frame 21, the window pane 20 can be removed from the receptacle and therefore easily changed. This is schematically shown in FIG. 6. The remaining components of the window element 10 can remain in the aircraft region 5, as a result of which the changing of the window pane 20 can be carried out rapidly and cost-effectively.

FIGS. 5a, 5b and 5c show schematically a perspective view of a further window element 10 with detailed sectional views. The window element 10 shown in FIGS. 5a-5c is a window element 12 for an emergency exit door of the aircraft 1. Most of the components of the window element 12 correspond to those of the window element 11 or 13, as is illustrated in FIGS. 4a-4c. The same components are therefore provided with the same reference signs. To simplify the description, only the differences between the window elements 12 and 11 and 13 will be explained below.

A displaceable window cover 50 is provided in the window element 12 for the emergency exit door of the aircraft 1 in such a manner that it can be displaced downwards via a guide 51 in a region behind the wall paneling 40. In the window element 11 or 13, as illustrated in FIGS. 4a-4c, the window cover can be opened upwards since space upwards is sufficiently available here. The displaceable window cover 50 is moved on the inside of the inner window pane 20, and therefore the window cover 50 in the closed state closes the window and darkens the interior of the aircraft 1.

Furthermore, in the case of the window element 12 (FIGS. 5a-5c), the cover 22 is designed to be somewhat more compressed, i.e., is kept shorter at the upper and lower edges. This is because of the differently configured wall paneling 40 which provides openings for further components of the emergency exit door of the aircraft 1.

Uniform holders 21 and inner window panes 20 can thereby be provided for all of the windows in the aircraft 1, as a result of which the number of different components in the aircraft 1 is reduced and therefore the aircraft 1 can be produced more cost-effectively.

The window elements 13 and 12 illustrated in FIGS. 4a and 5a can be produced completely outside the aircraft 1 and, only during the interior finishing of the aircraft 1 (the so-called FAL—Final Assembly Line), transported in their entirety to the production site of the aircraft 1 and installed in the aircraft 1. Of course, a window element 11 for an individual window (FIG. 3) can also be produced separately and subsequently installed in the aircraft 1. This involves half of the window element 13 from FIG. 4a.

Figure 7:
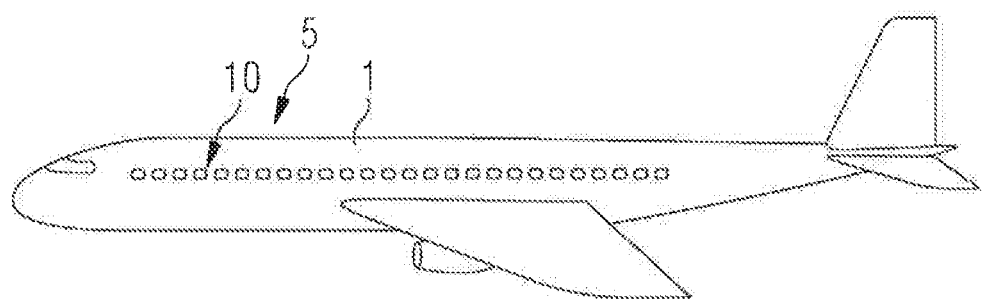
FIG. 7 shows an aircraft with a window element and an aircraft region.

FIG. 7 shows an aircraft 1 with a plurality of window elements 10 and an aircraft region 5.

The terms "on the inside" and "on the outside" relate here to direction details towards the aircraft interior or outwards from the aircraft interior.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A window element for an aircraft, comprising:
   a window frame which has a frame reveal forming an opening, and a receptacle adjoining said frame reveal;
   an inner window pane which is configured to be inserted into the receptacle;
   a holding frame which is configured to be inserted into the receptacle and to fix the inner window pane in the receptacle; and
   a cover which has an opening and is configured to be attached to the window frame and to conceal the window frame around the frame reveal,
   wherein the cover is further configured to conceal a portion of an interior paneling of an aircraft,
   wherein an encircling inner edge of the cover that forms the opening of the cover lies radially substantially outside an encircling outer edge of the holding frame.

2. The window element according to claim 1, wherein the receptacle has an encircling receiving reveal which extends substantially perpendicularly to a plane of the window pane, and a flange which, on a side of the encircling receiving reveal, faces an outer side of the aircraft, extends substantially parallel to the plane of the window pane towards the opening interior.

3. The window element according to claim 2, wherein the holding frame has a rear side and an outer side which correspond to a shape of the flange and of the receiving reveal, wherein the rear side of the holding frame faces the window pane when the holding frame fixes the window pane in place.

4. The window element according to claim 2, wherein the inner edge of the cover borders an edge of the receiving reveal facing the aircraft interior.

5. The window element according to claim 1, furthermore comprising:
   a wall paneling arranged on a side of the window frame facing the aircraft interior, and surrounding the receptacle.

6. The window element according to claim 5, wherein the cover is fastened to the wall paneling.

7. The window element according to claim 1, furthermore comprising:
   a displaceable window cover; and
   a guide for the displaceable window cover, wherein the guide is attached to the window frame or is integrated therein.

8. An aircraft region which comprises at least one window element according to claim 1.

9. The aircraft region according to claim 8, wherein the aircraft region is a fixed fuselage region of an aircraft.

10. The aircraft region according to claim 8, wherein the aircraft region is a door of the aircraft.

11. The aircraft region according to claim 10, wherein the door is an emergency exit door.

12. An aircraft with an aircraft region according to claim 8.

13. An aircraft with a window element according to claim 1.

* * * * *